United States Patent
Ikeda et al.

(10) Patent No.: US 7,503,660 B2
(45) Date of Patent: Mar. 17, 2009

(54) LIGHT MIXING MEMBER, MULTIPLE-LAMP LIGHTING EQUIPMENT AND PROJECTION VIDEO DISPLAY

(75) Inventors: Takashi Ikeda, Osaka (JP); Yoshitaka Kurosaka, Hyogo (JP); Hideyuki Kanayama, Kyoto (JP); Koji Ishii, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 555 days.

(21) Appl. No.: 10/550,886

(22) PCT Filed: Mar. 24, 2004

(86) PCT No.: PCT/JP2004/004112

§ 371 (c)(1),
(2), (4) Date: Sep. 27, 2005

(87) PCT Pub. No.: WO2004/088413

PCT Pub. Date: Oct. 14, 2004

(65) Prior Publication Data

US 2006/0050510 A1 Mar. 9, 2006

(30) Foreign Application Priority Data

Mar. 28, 2003 (JP) ............................. 2003-090136
Sep. 17, 2003 (JP) ............................. 2003-324867

(51) Int. Cl.
*G03B 21/14* (2006.01)

(52) U.S. Cl. .............................. 353/99; 353/38; 353/94; 362/234

(58) Field of Classification Search .................... 353/20, 353/38, 94, 98, 99, 81; 362/235, 253
See application file for complete search history.

(56) References Cited

U.S. PATENT DOCUMENTS 4,394,717 A * 7/1983 Brockwell .................. 362/247

(Continued)

FOREIGN PATENT DOCUMENTS

JP 62-023022 1/1987

(Continued)

OTHER PUBLICATIONS

Translation of the International Preliminary Report on Patentability of International Application No. PCT/JP2004/004112, with Form PCT/IB/338 and Form PCT/ISA/237.

(Continued)

*Primary Examiner*—William C Dowling
(74) *Attorney, Agent, or Firm*—Westerman, Hattori, Daniels & Adrian, LLP.

(57) ABSTRACT

A reflection mixing member (13) has an alignment in which light from a first light source is incident on a reflecting surface (13a) and light from a second light source is incident on a reflecting surface (13b). A relationship between a pitch Wp, which is a pitch between portions (triangular prisms) respectively formed of the reflecting surface (13a) and the reflecting surface (13b) in the reflection mixing member (13), and a lens pitch Wf is set to be (Wp/Wf≠1). As a result, light fluxes of respectively different distribution are incident on each lens portion of fly's eye lens 14a, so that it is possible to prevent luminance non-uniformity in light incident on a liquid crystal display panel (5) from being generated and prevent color non-uniformity from being generated on a screen at the same time.

8 Claims, 7 Drawing Sheets

U.S. PATENT DOCUMENTS

| | | | |
|---|---|---|---|
| 6,224,217 B1 * | 5/2001 | Tanaka | 353/94 |
| 6,517,212 B2 * | 2/2003 | Satou | 353/99 |
| 6,585,380 B2 * | 7/2003 | Yamamoto | 353/98 |
| 7,071,476 B2 * | 7/2006 | Rothweiler et al. | 250/492.2 |
| 7,237,909 B2 * | 7/2007 | Yokote et al. | 353/94 |

FOREIGN PATENT DOCUMENTS

| | | |
|---|---|---|
| JP | 06-308485 A | 11/1994 |
| JP | 09-015595 | 1/1997 |
| JP | 10-170916 | 6/1998 |
| JP | 11-039913 | 2/1999 |
| JP | 11-149061 | 6/1999 |
| JP | 11-271668 | 10/1999 |
| JP | 2001-021996 | 1/2001 |
| JP | 2001-166274 | 6/2001 |
| JP | 2001-166378 | 6/2001 |
| JP | 2001-201719 | 7/2001 |
| JP | 2001-215619 | 8/2001 |
| JP | 2001-268588 | 9/2001 |
| JP | 2002-296679 | 10/2002 |
| JP | 2002-352611 | 12/2002 |

OTHER PUBLICATIONS

Office Action issued in JP 2007-263813, dated Feb. 26, 2008.

* cited by examiner ively different light intensity distribution are incident on each of lens portions of a light-incidence side fly's eye lens in the pair of fly's eye lenses.

LIGHT MIXING MEMBER, MULTIPLE-LAMP LIGHTING EQUIPMENT AND PROJECTION VIDEO DISPLAY

TECHNICAL FIELD

The present invention relates to a light mixing member, a multiple-light type illuminating device, and a projection type video display.

BACKGROUND ART

Conventionally, as an apparatus for displaying a large-screen image, it is known a liquid crystal projector configured such that light from an illuminating device is irradiated on a liquid crystal display panel, and an image displayed on the liquid crystal display panel is projected on a screen. There is a liquid crystal projector that uses a multiple-light type illuminating device using a plurality of light sources as the illuminating device (see Japanese Patent Laying-open No.2002-296679). As shown in FIG. 9, a multiple-light type illuminating device 50 is so configured as to combine light fluxes emitted from a first light source 51 and a second light source 52 by a reflection mixing member 53. The reflection mixing member 53, also as shown in FIG. 7, has first reflecting surfaces 53a and second reflecting surfaces 53b one after another. The reflection mixing member 53 is also referred to as a prism array. By using a plurality of small light sources in such the multiple-light type illuminating device 50, it becomes possible to have better lifetime of light sources and higher efficiency of a convergence of light because an arc length of each light source is shortened, and it becomes also possible to continue projecting even if light-emitting stops (e.g., lamps are dead) due to an expiration of an operating life of the light sources.

Incidentally, a configuration in which an integrator lens is arranged on a light-exit side of the reflection mixing member 53 is adopted in many cases. The integrator lens is formed of a pair of fly's eye lenses and is designed such that each pair of convex lenses guides light from the light sources onto an entire surface of a liquid crystal display panel, so that partial luminance non-uniformity existing in the light emitted from the light sources is evened off and a difference between a light amount at a screen center and that at a screen perimeter is reduced.

However, in the configuration in which the integrator lens is arranged on the light-exit side of the reflection mixing member 53, as shown in FIG. 6, in a case that a ratio of a pitch Wp of a triangular prism formed of the first reflecting surface 53a and the second reflecting surface 53b in the reflection mixing member 53 to a lens pitch Wf of a light-incidence side fly's eye lens 55 of the integrator lens is 1 to 1, for example, light fluxes having the same pattern are incident on each lens portion 55a of the fly's eye lens 55, and the light fluxes having the same pattern are converged on a liquid crystal display panel 55. As a result, luminance non-uniformity is generated in the light incident on the liquid crystal display panel.

Furthermore, in the configuration in which the integrator lens is arranged on the light-exit side of the reflection mixing member 53, as shown in FIG. 8, as might be expected, light is guided from the reflection mixing member 53 both onto an upper area and a lower area of a light-incidence surface of the light-incidence side fly's eye lens 55 of the integrator lens in the same luminance non-uniformity pattern. Therefore, if the pattern of light flux guided to the liquid crystal display panel (LCD) by each pair of lenses on the upper area is the pattern in a frame described as "upper half" in FIG. 8, the pattern of light flux guided to the liquid crystal display panel (LCD) by each pair of lenses on the lower area is the same pattern (see "lower half" in FIG. 8). As a result of this, the above-described pattern is emphasized on the liquid crystal display panel (LCD), so that the luminance non-uniformity is generated in a projected image.

In a projector using three liquid crystal display panels, in particular, a configuration in which an optical path length of one color out of three primary colors is different is adopted for reducing in size of a color separating and mixing system and a relay optical system is used so that the optical path length of one color is optically coincident with that of the other two colors. Accordingly, light is incident on the liquid crystal display panel in a state that the only one color mentioned above is reversed to right to left and up to down with respect to the other two colors. As a result, a difference in luminance distribution between the one color and the other two colors is generated. This difference in luminance distribution of respective colors generates luminance non-uniformity and color non-uniformity in a projected image on a screen. For eyes of human being, it is easier to perceive color non-uniformity than luminance non-uniformity, so that this color non-uniformity greatly reduces a quality of a displayed image.

SUMMARY OF THE INVENTION

In view of the foregoing circumstances, it is an object of the present invention to provide a light mixing member, a multiple-light type illuminating device, and a projection type video display, capable of illuminating without generating luminance non-uniformity and color non-uniformity.

In order to solve the above-mentioned problem, a multiple-light type illuminating device according to the present invention comprises a first light source and a second light source for emitting approximately collimated light, a light mixing member in which first optical elements that guide light emitted from the first light source in a specific direction and second optical elements that guide light emitted from the second light source in a direction parallel to the specific direction are arranged alternately, and a pair of fly's eye lenses provided on a light-exit side of the light mixing member. The first optical elements and the second optical elements are arranged in such a manner that light fluxes of respectively different light intensity distribution are incident on each of lens portions of a light-incidence side fly's eye lens in the pair of fly's eye lenses.

With the above-described configuration, it is possible to prevent light fluxes having the same pattern from being incident on each of lens portions of the fly's eye lens. As a result, it is possible to prevent luminance non-uniformity from being generated in light incident on an object to be illuminated, and prevent color non-uniformity from being generated in an image on a screen at the same time.

A ratio of a pitch between portions, each of which is formed of the first optical element and the second optical element, to a lens pitch of the fly's eye lens may be set within a range other than 1±0.2. Furthermore, a ratio of the pitch between portions, each of which is formed of the first optical element and the second optical element to a lens pitch of the fly's eye lens may be set within a range other than 1/N (N is a natural number). In addition, pitches between portions which are respectively formed of the first optical member and the second optical member may be allowed to have variations.

Moreover, a projection type video display according to the present invention is a projection type video display that modulates light emitted from an illuminating device by a light valve and projects the light, and comprises any one of the above-described multiple-light type illuminating devices as the illuminating device.

Furthermore, a light mixing member according to the present invention is a light mixing member having a shape in which first optical elements that guide light received from a first direction in a specific direction and second optical elements that guide light received from a second direction in a direction parallel to the specific direction are arranged alternately, and includes at least two areas divided by a line perpendicular to join lines of the first optical elements and the second optical elements, and is so configured that the join lines in a certain area out of the divided areas are deviated from the join lines in a different area out of the divided areas, so that the join lines in the certain area and the join lines in the different area are not aligned in a straight line.

In a light mixing member of the above-described configuration, it may be configured that the light mixing member includes a plurality of optical parts having a size smaller than that of a required light-receiving area joined in such a manner as to be deviated from one another, each optical part has a shape in which first optical elements and second optical elements are arranged alternately, and light incident from a first direction is guided by the first optical elements in a specific direction and light incident from a second direction is guided by the second optical elements in a direction parallel to the specific direction. In addition, a multiple-light type illuminating device may be so configured as to comprise the light mixing member according to these configurations, a first light source that is provided on the first direction and emits illuminating light toward the first optical elements, and a second light source that is provided on the second direction and emits illuminating light toward the second optical elements.

Moreover, a projection type video display according to the present invention is a projection type video display that modulates a light emitted from an illuminating device by a light valve and projects the light, and comprises the multiple-light type illuminating device as the illuminating device and a pair of fly's eye lenses on a light-emitting side of the multiple-light type illuminating device.

In the configuration in which the light mixing member is divided into areas, the join lines in a certain area out of the divided areas are deviated from the join lines in a different area out of the divided areas, so that the join lines in the certain area and the join lines in the different area are not aligned in a straight line. Therefore, light is guided from the light mixing member to an upper area and a lower area respectively, of the incidence-surface of the fly's eye lens in a different luminance non-uniformity pattern. Therefore, there is a difference between a pattern of a light flux guided to a light valve by each pair of fly's eye lenses on the upper area and a pattern of the light flux guided to the light valve by each pair of fly's eye lenses on the lower area, so that luminance non-uniformity is easier to be cancelled out and luminance non-uniformity on a projected image is reduced.

In addition, in a projection type video display of such the configuration, it is preferable that an image of an area border line of the light mixing member is guided to a valley portion between lenses in a light-incidence side lens group in the pair of fly's eye lenses. With this configuration, it is possible to prevent a dark line, which is an image of the area border line, from being guided to the light valve by each pair of lenses.

Figure 4:
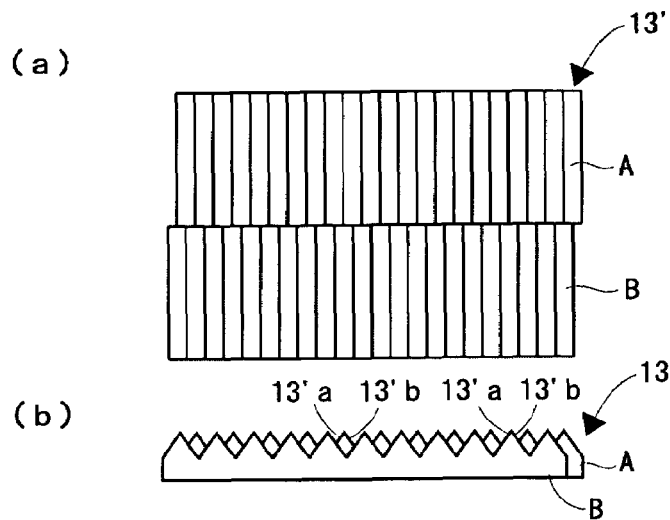
FIG. 4 is a diagram showing Embodiment 2 of the present invention.
Figure 5:
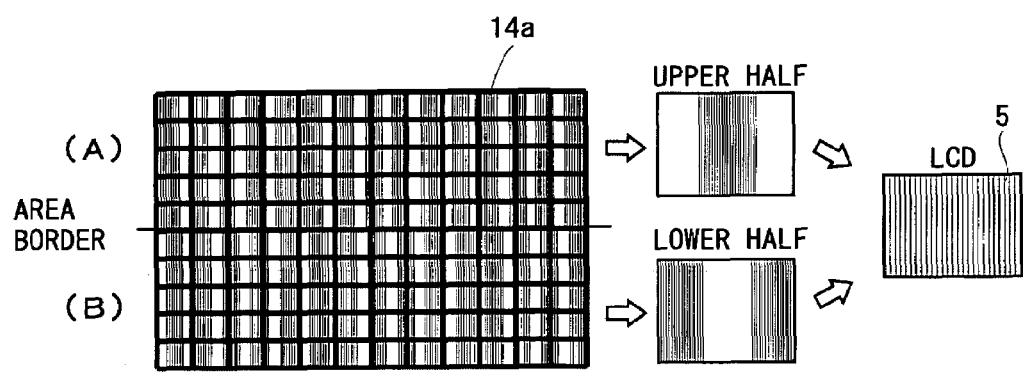
Figure 6:
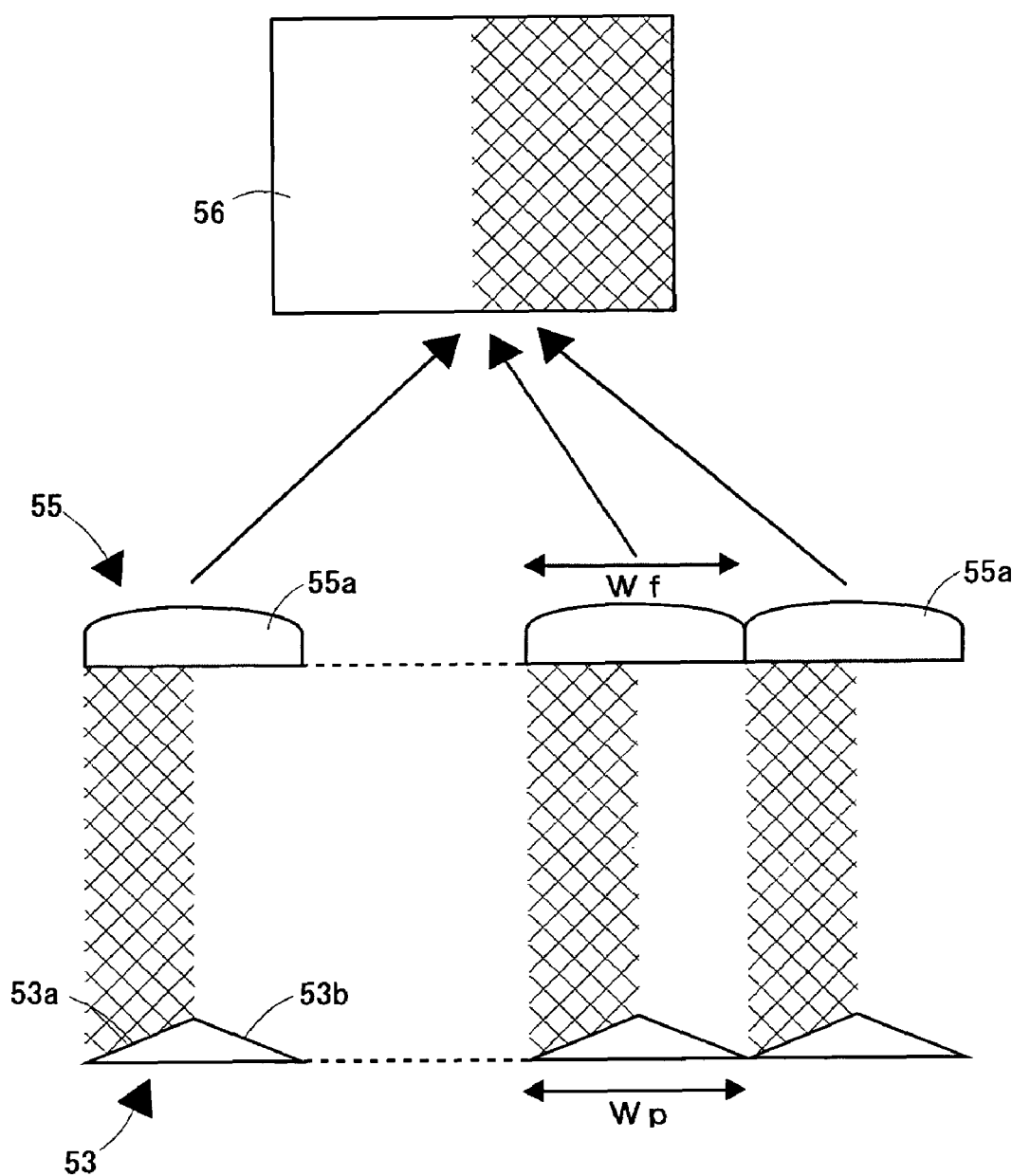
Figure 7:
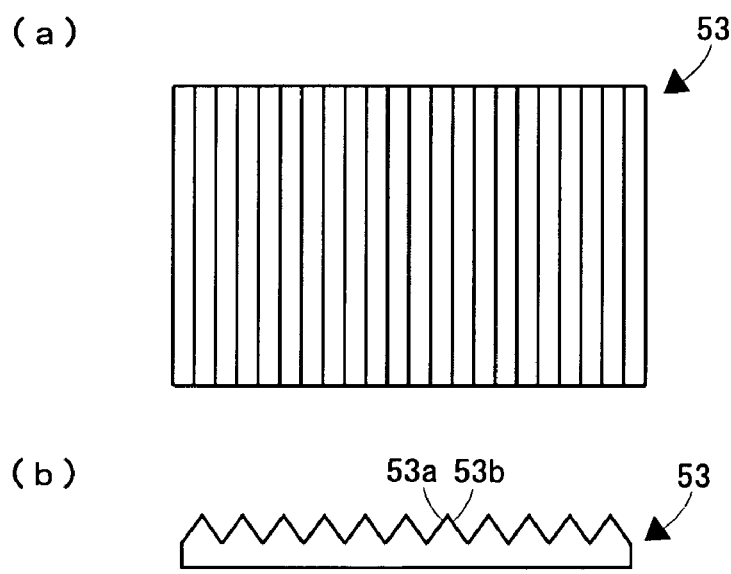
Figure 8:
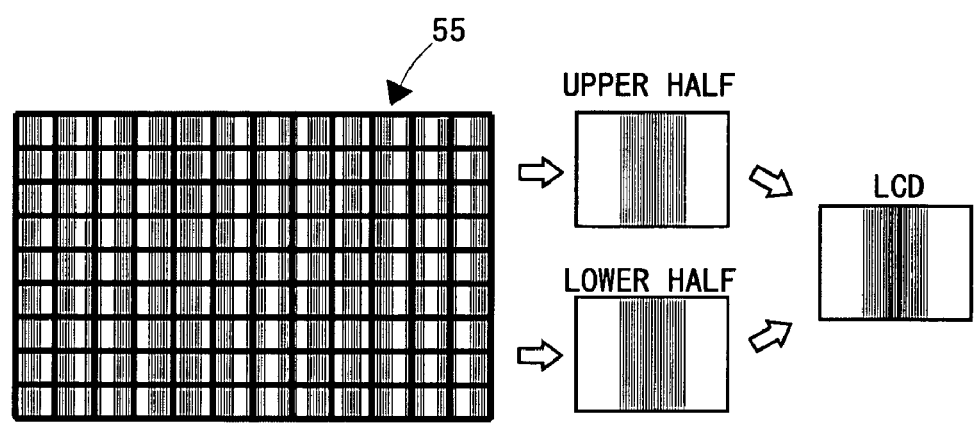
Figure 9:
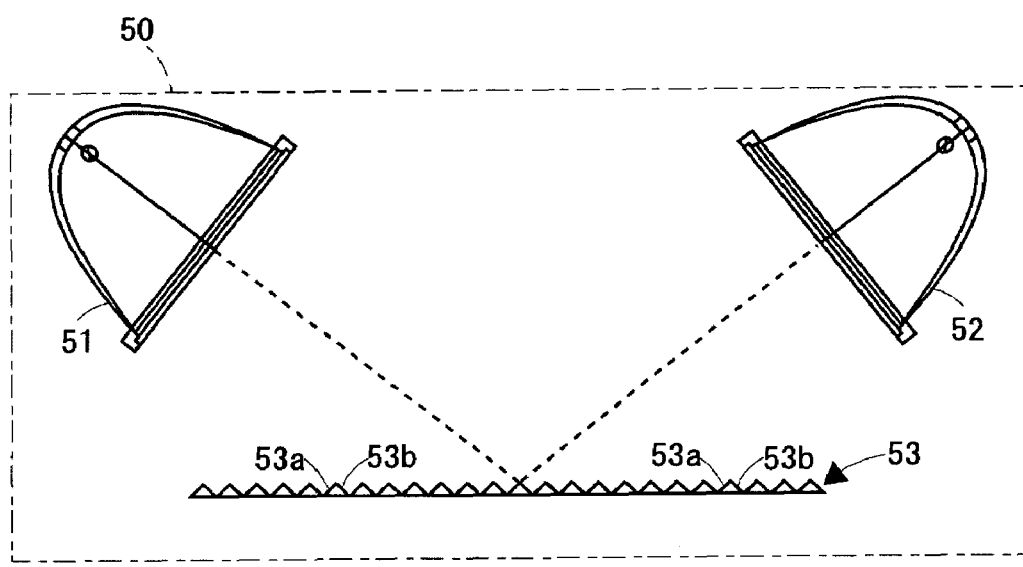

A portion (a) in FIG. 4 is a plan view of a reflection mixing member;

A portion (b) in FIG. 4 is a side view of the reflection mixing member;

FIG. 5 is a diagram showing Embodiment 2 of the present invention, and is a descriptive diagram showing a luminance pattern on a light-incidence side fly's eye lens and a luminance pattern on a liquid crystal display panel;

FIG. 6 is a descriptive diagram showing an arrangement relationship between a reflection mixing member and a light-incidence side fly's eye lens in a conventional configuration;

FIG. 7 is a diagram showing a conventional example;

A portion (a) in FIG. 7 is a plan view of a reflection mixing member;

A portion (b) in FIG. 7 is a side view of the reflection mixing member;

FIG. 8 is a diagram showing a conventional example and is a descriptive diagram showing a luminance pattern on a light-incidence side fly's eye lens and a luminance pattern on a liquid crystal display panel; and FIG. 9 is a descriptive diagram showing a conventional multiple-light type illuminating device.

BEST MODE FOR PRACTICING THE INVENTION

Embodiment 1

Hereinafter, a multiple-light type illuminating device and a projection type video display according to Embodiment 1 of the present invention will be described with reference to FIGS. 1 to 3.

Figure 1:
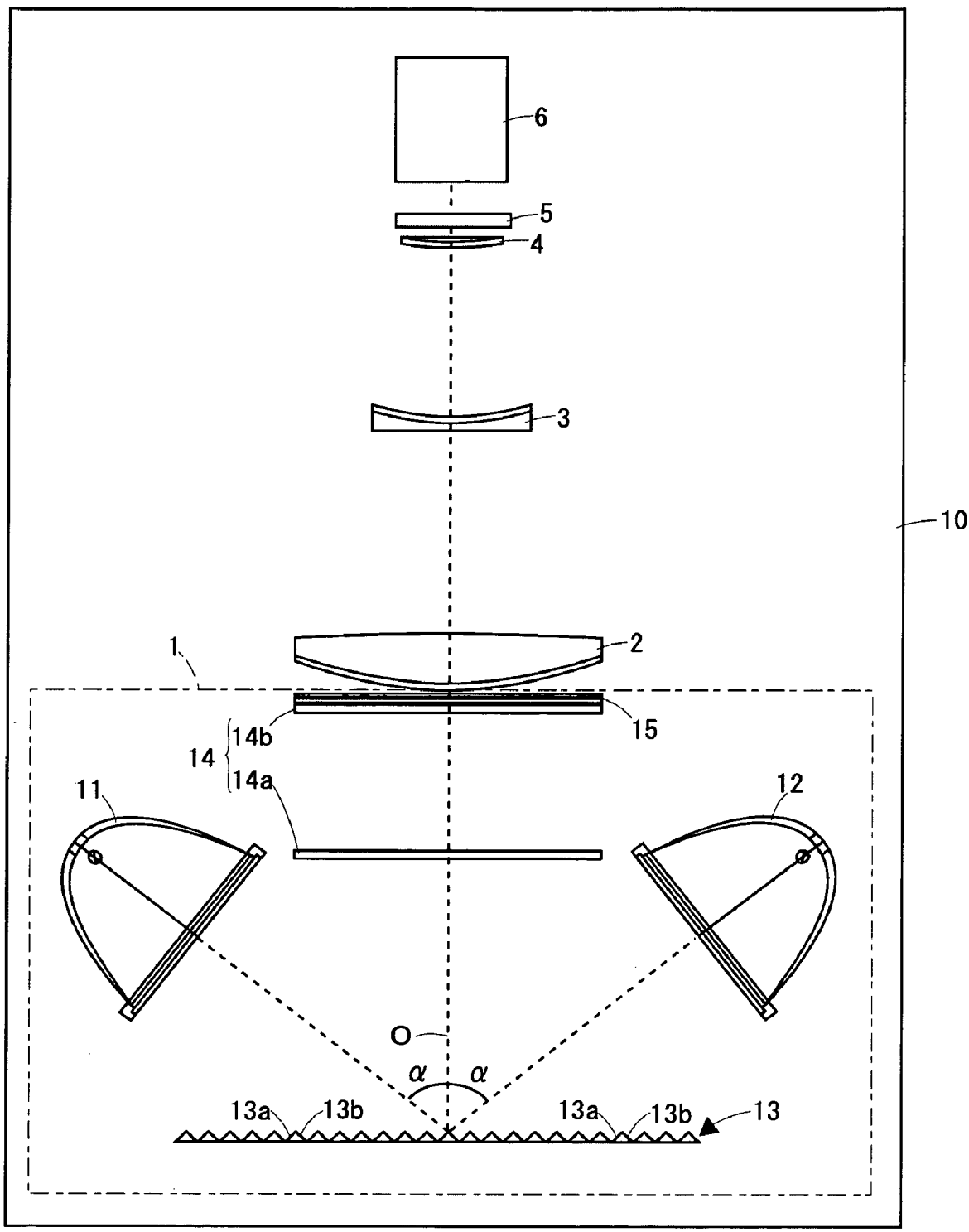
FIG. 1 is a descriptive diagram showing an optical system of a multiple-light type illuminating device and a projection type video display according to Embodiment 1 of the present invention.

FIG. 1 is a schematic constructional view showing the multiple-light type illuminating device and the projection type video display according to an embodiment of the present invention. A configuration of the multiple-light type illuminating device and the projection type video display according to this embodiment is basically the same as that disclosed in Japanese Patent Laying-open No.2002-296679, which was also shown in the background art section. The multiple-light type illuminating device 1 is formed of being provided with a first light source 11, a second light source 12, a reflection mixing member 13, an integrator lens (a pair of fly's eye lenses) 14, and a polarization conversion system 15. In addition, a projection type video display 10 is formed of being provided with the multiple-light type illuminating device 1, condenser lenses 2, 3, and 4, a liquid crystal display panel 5, and a projection lens 6. It is noted that, for the sake of simplicity, an optical system having a single-panel configuration is shown in FIG. 1. In a so-called three-panel configuration, a color separating optical system (dichroic mirror, etc.) and a color mixing system (cross dichroic prism, etc.) are added, for example.

Light-emitting portions of the light sources 11, 12 are formed of an ultra-high pressure mercury lamp, a metal halide lamp, a xenon lamp, and the like, and an irradiating light thereof is approximately collimated by a parabolic reflector and emitted. The reflection mixing member 13, for example, has structure in which a plurality of triangular prisms are formed on a surface of a glass plate, metal having high reflectance is evaporated on inclined planes of the triangular prisms, and the inclined planes serve as first reflecting surfaces 13a and second reflecting surfaces 13b.

In FIG. 1, an optical axis of reflected light and a normal line O of the reflection mixing member 13 are shown in common. The optical axis of the light flux emitted from the light source 11 and the normal line O are arranged so as to form a predetermined angle α. Similarly, the optical axis of the light flux emitted from the light source 12 and the normal line O are arranged so as to form the predetermined angle α. It is noted that the predetermined angle α is an angle formed in a plane surface perpendicular to the reflecting surfaces 13a, 13b. The angle (apex angle) of the inclined planes (reflecting surfaces 13a, 13b) of the triangular prisms and location (directions) of the first light source 11 and the second light source 12 are adjusted in such a manner that the light emitted from the first light source 11 is reflected by the reflecting surface 13a in the direction parallel to the normal line O and the light emitted from the second light source 12 is reflected by the reflecting surface 13b in the direction parallel to the normal line O.

The integrator lens 14 is arranged parallel to the reflection mixing member 13 (perpendicular to the normal line O). The integrator lens 14, as described in the background art section, is formed of a pair of fly's eye lenses 14a, 14b and is constructed such that each pair of convex lenses guides light from the light sources 11, 12 onto an entire surface of a liquid crystal display panel 5, so that partial luminance non-uniformity existing in the light emitted from the light sources 11,12 is evened off and a difference between light amount at a screen center and that at a screen perimeter is reduced.

The polarization conversion system 15 is structured of a polarizing beam splitter array (Hereinafter, referred to as a PBS array). The PBS array is provided with a polarized light separating surface and a retardation plate (½ λ plate). Each polarized light separating surface of the PBS array transmits P-polarized light, for example, out of light from the integrator lens 14, and changes an optical path of S-polarized light by 90 degrees. The S-polarized light having the optical path changed is reflected by an adjacent polarized light separating surface, converted into the P-polarized light by the retardation plate provided on a front side (light-exit side) of the polarized light separating surface, and outgone therefrom. On the other hand, the P-polarized light that passes through the polarized light separating surface is outgone as it is. That is, in this case, approximately all the light is converted into the P-polarized light. In the above-described example, descriptions are made regarding a configuration in which all the light is converted into the P-polarized light. However, it may be possible to configure such that all the light is converted into the S-polarized light by providing the retardation plate in a position where P-polarized light is outgone.

The light emitted from the multiple-light type illuminating device 1 reaches the liquid crystal display panel 5 via the condenser lenses 2, 3, and 4. The light incident on the liquid crystal display panel 5 becomes an image light by light intensity modulation according to light transmissivity set in each dot, and is projected by the projection lens 6 on a screen not shown.

Figure 2:
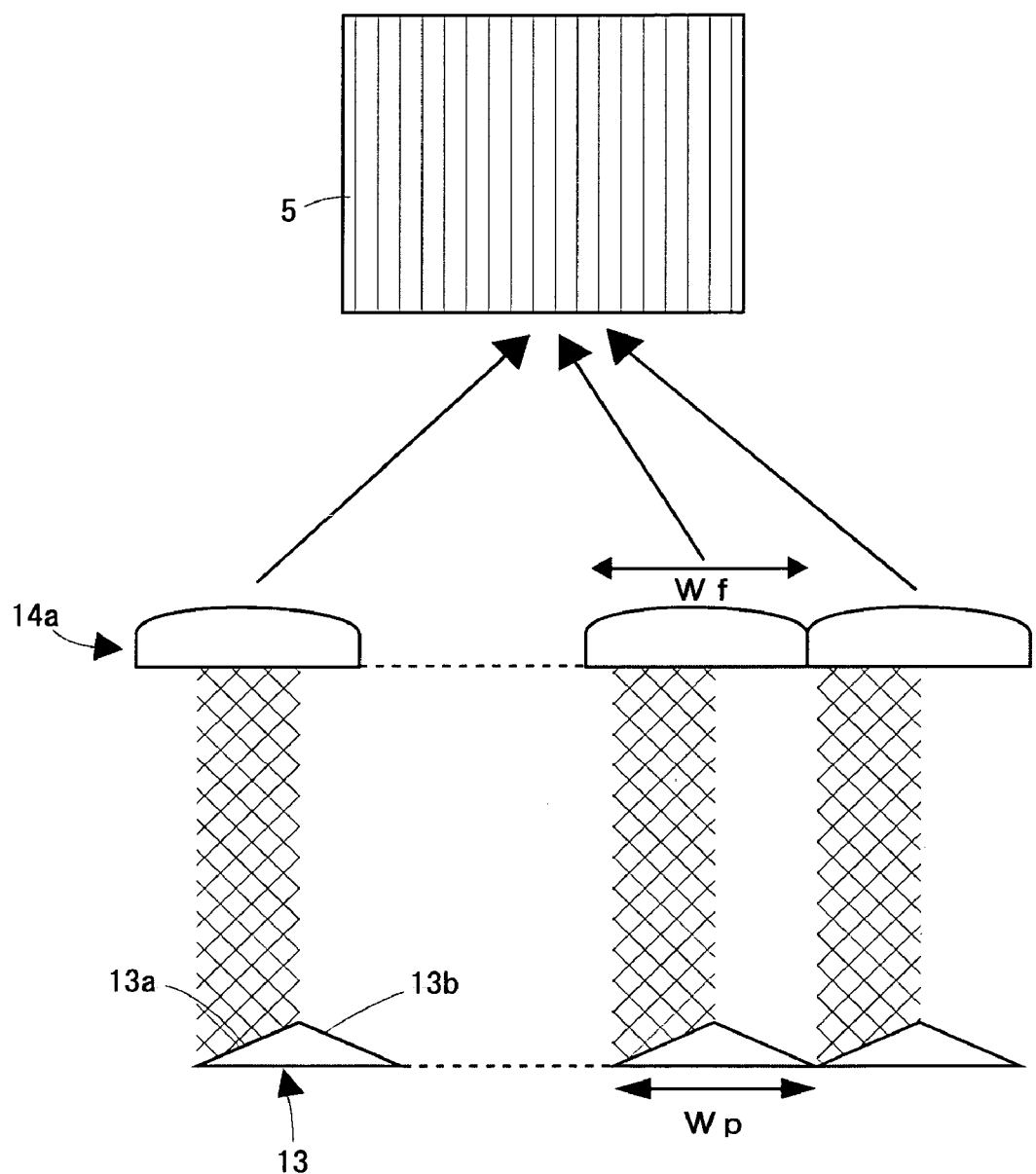
FIG. 2 is a descriptive diagram showing an arrangement relationship between a reflection mixing member and a light-incidence side fly's eye lens in a configuration of FIG. 1.

FIG. 2 is a descriptive diagram showing an arrangement relationship between the reflection mixing member 13 and the light-incidence side fly's eye lens 14a. A pitch Wp of the triangular prism in the reflection mixing member 13 (a portion formed of the reflecting surface 13a and the reflecting surface 13b) is almost the same in length as a lens pitch Wf of the fly's eye lens 14a. However the pitch Wp is so set as not to be equal to the lens pitch Wf.

That is, although Wp/Wf is equal to (=) 1 in the configuration of FIG. 6 shown in the background art section, Wp/Wf is not equal to (≠) 1 in the embodiment shown in FIG. 2. This means that the relationship between the pitch Wp and the lens pitch Wf is set such that light fluxes of respectively different luminance distribution are incident on each of the lens portions of the fly's eye lens 14a. Accordingly, it is possible to prevent the same pattern light fluxes from being incident on each of the lens portions of the fly's eye lens 14a and to avoid generating luminance non-uniformity in the light incident on the liquid crystal display panel 5.

Figure 3:
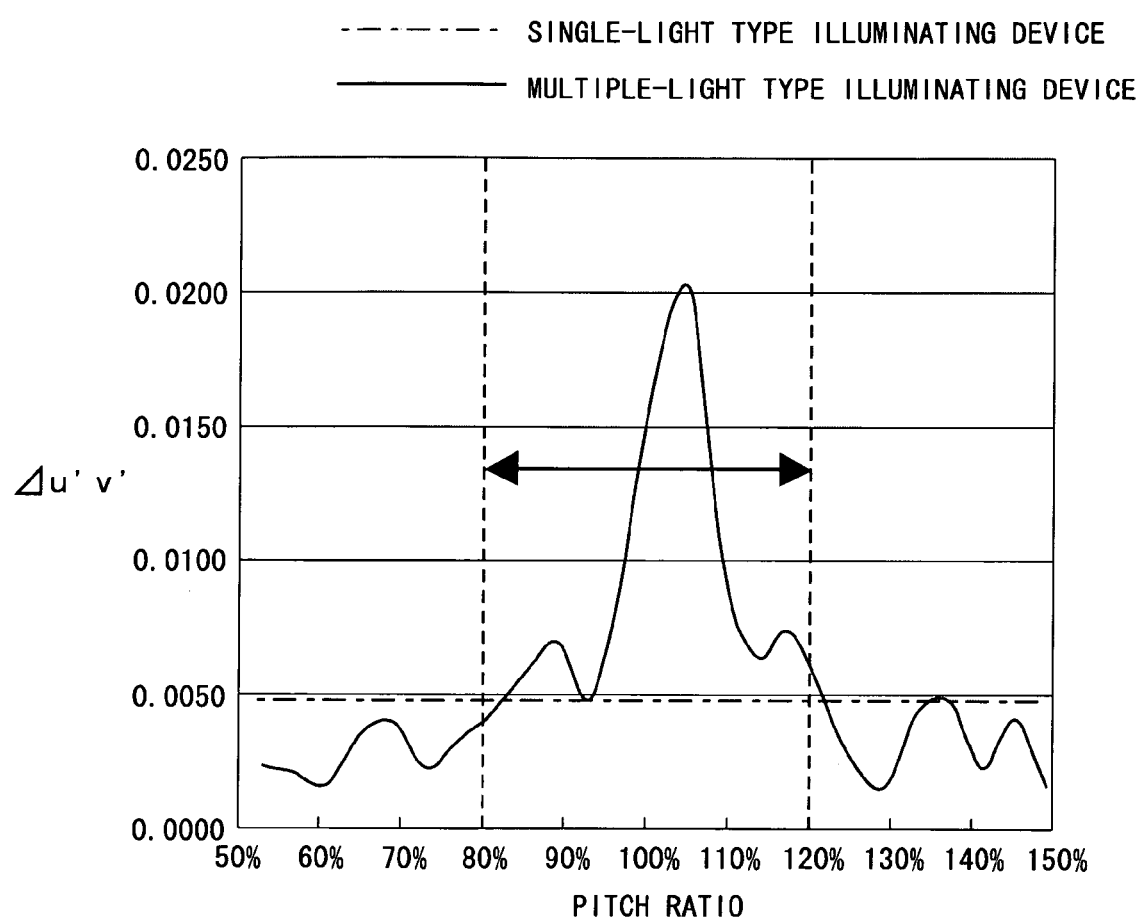
FIG. 3 is a graph by a simulation showing a relationship between color non-uniformity and a pitch ratio in a multiple-light type illuminating device.

FIG. 3 is a graph obtained by a simulation and shows a relationship between color non-uniformity and a pitch ratio in the multiple-light type illuminating device. In the graph, an arc length of lamps in the light sources 11, 12 is 1.3 mm (millimeters), a horizontal axis is a ratio (pitch ratio) of the pitch Wp to the lens pitch Wf, and a vertical axis is an extent of the color non-uniformity (Δu' v'). In this graph, when Wp/Wf is equal to (=) 1, the pitch ratio is shown as 100 percent. In addition, the liquid crystal display panel 5 is divided into nine areas of three-by-three, an average amount of light in each area is evaluated, a chromaticity coordinates of white color at each point (u', v') is calculated from the representative chromaticity coordinates of respective colors and the average amount of light, and a maximum value of distance between the coordinates of nine points (u', v') are shown as above-described Δu' v'. Furthermore, in this graph, Δ u' v'(in the vicinity of 0.0050) in an existing single-light type illuminating device using one light source (herein, the arc length is 1.3 mm) is included. As shown in this graph, the multiple-light type illuminating device indicates as less color non-uniformity as the single-light type illuminating device does, within a range in which the pitch ratio is other than from 80 percent to 120 percent, that is, a range other than Wp/Wf= (equal to) 1±(plus or minus) 0.2. Accordingly, it is preferable to set Wp and Wf within a range other than Wp/Wf=(equal to) 1±(plus or minus) 0.2.

Incidentally, a degree of parallelization of the emitted light from the light sources 11, 12 relies on the arc length of the lamps. In an ideal light source having an extremely short arc length, even within a range other than Wp/Wf=(equal to) 1±(plus or minus) 0.2, it is expected that color non-uniformity is generated in a case that a denominator is a natural number, such as Wp/Wf=(equal to) ½ or Wp/Wf=(equal to) ⅓.

Accordingly, Wp and Wf are set such that the denominator is other than a natural number, such as Wp/Wf≠(not equal to) ½ or Wp/Wf≠(not equal to) ⅓. As a result of this, the relationship between the pitch Wp and the lens pitch Wf is set such that light fluxes of respectively different luminance distribution are incident on each of the lens portions of the fly's eye lens 14a. Accordingly, it is possible to prevent light fluxes having the same pattern from being incident on each of the lens portions of the fly's eye lens 14a. As a result, also in the ideal light source having the extremely short arc length, it is possible to prevent luminance non-uniformity from being generated in the light incident on the liquid crystal display panel 5, and also to avoid color non-uniformity on the screen.

Furthermore, instead of equalizing all the pitches Wp, the pitches Wp may be so set as to be partially different (the pitches Wp are allowed to have variations). For example, a portion where an interval between the triangular prisms (portions formed of the reflecting surfaces 13a, 13b in the reflection mixing member 13) is equal to pitch Wp' (the pitch Wp'≠(not equal to) the pitch Wp) may be set at every fifth pitch. In this case, as for the pitch Wp, the denominator may be a natural number, such as Wp/Wf=(equal to) ½. Also in the case that such the configuration is adopted, the relationship between the pitch Wp and the lens pitch Wf is set such that light fluxes of respectively different luminance distribution are incident on each of the lens portions of the fly's eye lens 14a. Accordingly, it is possible to prevent the light fluxes having the same pattern from being incident on each of the lens portions of the fly's eye lens 14a. As a result, it is possible to prevent luminance non-uniformity from being generated in the light incident on the liquid crystal display panel 5, and also avoid color non-uniformity on the screen.

Embodiment 2

Hereinafter, a light mixing member (reflection mixing member), a multiple-light type illuminating device, and a projection type video display according to Embodiment 2 of the present invention will be described with reference to FIGS. 4 to 5. It is noted that a configuration of the multiple-light type illuminating device and the projection type video display is basically similar to that of Embodiment 1, and therefore, a description will be made with reference to FIG. 1, too.

A reflection mixing member 13', also shown as in the plan view of the portion (a) in FIG. 4 and in the side view of the portion (b) in FIG. 4, is so configured as to have an area A and an area B. That is, the reflection mixing member 13' is divided into the two areas A, B by a line perpendicular to ridge lines of triangular prisms, and the area A and the area B deviate from each other by half the distance corresponding to the pitch between the ridge lines of the triangular prisms. The respective areas A, B are structured of two reflective optical parts (hereinafter, in some cases, symbols A, B are attached also to the reflective optical parts) having half the size of a required light receiving area, and the reflection mixing member 13' is formed by combining these two reflective optical parts A, B.

The reflective optical parts A, B have structure in which a plurality of triangular prisms are formed on a surface of a glass plate, metal having high reflectance is evaporated on inclined planes of the triangular prisms, and the inclined planes are first reflecting surfaces 13'a and second reflecting surfaces 13'b, for example. The angle (apex angle) of the inclined planes (reflecting surfaces 13'a, 13'b) of the reflective optical parts A, B and location (directions) of the first light source 11 and the second light source 12 are adjusted in such a manner that the light emitted from the first light source 11 is reflected by the reflecting surface 13'a in the direction parallel to the normal line O and the light emitted from the second light source 12 is reflected by the reflecting surface 13'b in the direction parallel to the normal line O.

In this embodiment, the reflection mixing member 13' is divided into the areas as mentioned above, and the ridge lines (join lines) of the triangular prisms in the area A is deviated from those in the area B, so that the ridge lines in the area A and the ridge lines in the area B are not aligned in a straight line. Therefore, as shown in FIG. 5, light is guided from the reflection mixing member 13' onto the light-incidence surface of the incidence-side fly's eye lens 14a in a luminance non-uniformity pattern which differs depending on whether an upper area or a lower area. Therefore, there is a difference between a pattern of the light flux guided to the liquid crystal display panel 5 by each pair of fly' eye lenses on the upper area and a pattern of the light flux guided to the liquid crystal display panel 5 by each pair of fly's eye lenses on the lower area, so that luminance non-uniformity is easier to be cancelled out and luminance non-uniformity on a projected image is reduced.

Also in this configuration, each fly's eye lens is formed by having 10 lens cells vertically and 12 lens cells horizontally, and a border between the upper area and the lower area is located on a valley between the lens cells. That is, an image of the area border line of the reflection mixing member 13' is guided to a valley portion between the lenses in the light-incidence side lens group in the pair of fly's eye lenses. According to this configuration, it is possible to prevent a dark line, which is the image of the area border line, from being guided to the liquid crystal display panel 5 by each pair of lenses.

In the above-described configuration, the reflection mixing member 13' is formed by combining the two reflective optical parts in such a manner as to be deviated from each other. However, by processing one base plate (glass base plate, etc), it is possible to form the areas A, B on the above-mentioned one base plate. However, the configuration in which the two reflective optical parts are combined is easier to manufacture. Furthermore, the reflection mixing member may be divided into three areas or more, instead of being divided into two areas. In a case that the reflection mixing member is divided into three areas, each area may deviate from one another by one-third of the distance corresponding to the pitch between the ridge lines of the triangular prisms.

It is noted that the liquid crystal display panel 5, which is a transmission type, is used in these configurations. However, instead of the transmission type, a reflection type liquid crystal display panel may be used. Or a light modulating element, a type in which each one of micro mirrors is driven singly, for example, may be used instead of the liquid crystal display panel. Moreover, the light from the first and the second light sources 11, 12 is combined by the reflection mixing members 13, 13'. However this is not always the case. A transparent member in which a plurality of triangular prisms are formed on a surface of a glass plate may be used, for example, in order to combine light from the first light source 11 and the second light source 12 by transmitting and refracting the light.

As described above, the present invention has an advantage that it is possible to illuminate light without generating luminance non-uniformity and color non-uniformity and project high-quality image in the projection type video display.

What is claimed is:

1. A multiple-light type illuminating device, comprising:
   a first light source and a second light source for emitting approximately collimated light;
   a light mixing member having a plurality of optical members;
   said plurality of optical members each having a first optical element and a second optical element;
   said first optical element guides light emitted from the first light source in a specific direction and said second optical element guides light emitted from the second light source in a direction parallel to the specific direction;
   said plurality of optical members each having a pitch formed of the first optical element and the second optical element;

a pair of fly's eye lenses provided on light-exit side of the light mixing member; and said pitch of the plurality of optical members have variations so that light fluxes of respectively different patterns are incident on each lens portions of a light-incidence side fly's eye lens in the pair of fly's eye lenses.

2. A projection type video display that modulates light emitted from an illuminating device by a light valve and projects the light, comprising the multiple-light type illuminating device according to claim 1 of the illuminating device.

3. A method of arranging a light mixing member having a shape in which first optical elements that guide light received from a first direction in a specific direction and second optical elements that guide light received from a second direction in a direction parallel to the specific direction are arranged alternately, comprising:

dividing the light mixing member into at least two areas by a line perpendicular to join lines of the first optical elements and the second optical elements; and deviating the join lines in a certain area out of the divided areas from the join lines in a different area out of the divided areas, so that the join lines in the certain area and the join lines in the different area are not aligned in a straight line.

4. The method according to claim 3, including a plurality of optical parts joined in such a manner as to be deviated from one another, wherein each optical part has a shape in which the first optical elements and the second optical elements are arranged alternately, and light incident from the first direction is guided by the first optical elements in the specific direction and light incident from the second direction is guided by the second optical elements in the direction parallel to the specific direction.

5. The method light mixing member according to claim 3, including a plurality of optical parts having a size smaller than that of a required light-receiving area joined in such a manner as to be deviated from one another, wherein each optical part has a shape in which the first optical elements and the second optical elements are arranged alternately, and light incident from the first direction is guided by the first optical elements in the specific direction and light incident from the second direction is guided by the second optical elements in the direction parallel to the specific direction.

6. A multiple-light type illuminating device comprising:

the light mixing member according to the method of any one of claims 3 to 5;

a first light source that is provided on the first direction and emits illuminating light toward the first optical elements; and a second light source that is provided on the second direction and emits illuminating light toward the second optical elements.

7. A projection type video display that modulates light emitted from an illuminating device by a light valve and projects the light, comprising the multiple-light type illuminating device according to claim 6, wherein a pair of fly's eye lenses are provided on a light-emitting side of the multiple-light type illuminating device.

8. The projection type video display according to claim 7, wherein an image of an area border line of the light mixing member is guided to a valley portion between lenses in a light-incidence side lens group in the pair of fly's eye lenses.

* * * * *